United States Patent
Liu et al.

(10) Patent No.: US 10,876,973 B2
(45) Date of Patent: Dec. 29, 2020

(54) SYSTEM AND METHOD FOR REMOTE DETECTION OF SERS SPECTRA

(71) Applicant: Dongguan University Of Technology, Dongguan (CN)

(72) Inventors: Ye Liu, Dongguan (CN); Fei Zhou, Dongguan (CN); Hongcheng Wang, Dongguan (CN)

(73) Assignee: Dongguan University Of Technology, Dongguan (CN)

( * ) Notice: Subject to any disclaimer, the term of this patent is extended or adjusted under 35 U.S.C. 154(b) by 0 days.

(21) Appl. No.: 16/745,730

(22) Filed: Jan. 17, 2020

(65) Prior Publication Data

US 2020/0232923 A1  Jul. 23, 2020

(30) Foreign Application Priority Data

Jan. 21, 2019 (CN) .......................... 2019 1 0052916

(51) Int. Cl.
| | |
|---|---|
| *G01J 3/44* | (2006.01) |
| *G01N 21/65* | (2006.01) |
| *G01K 11/32* | (2006.01) |
| *H01S 3/30* | (2006.01) |

(52) U.S. Cl.
CPC .............. *G01N 21/658* (2013.01); *G01J 3/44* (2013.01); *G01K 11/32* (2013.01); *H01S 3/302* (2013.01); *G01K 2011/324* (2013.01)

(58) Field of Classification Search
CPC ...... G01N 21/658; G01N 21/65; G01N 21/64; G01J 3/44; G01K 2011/324
See application file for complete search history.

(56) References Cited

U.S. PATENT DOCUMENTS

2012/0281209 A1* 11/2012 Bai .......................... G01J 3/44
356/301

FOREIGN PATENT DOCUMENTS

| CN | 102721679 A | 10/2012 |
|---|---|---|
| CN | 107478640 A | 12/2017 |

* cited by examiner

*Primary Examiner* — Abdullahi Nur
(74) *Attorney, Agent, or Firm* — Troutman Pepper Hamilton Sanders LLP; Christopher C. Close, Jr.

(57) ABSTRACT

A remote SERS spectrum detection system and a method thereof. The system includes: a pulsed laser light source, configured to emit Raman excitation light; an optical fiber Raman coupling module, configured to couple the Raman excitation light; the optical fiber Raman probe, configured to transmit the Raman excitation light to an object to be measured to generate a SERS signal light, a backscattered SERS signal light being coupled to a monochromator through the optical fiber Raman coupling module; the monochromator, configured to split the backscattered SERS signal light, to obtain backscattered SERS signal lights at different wavelengths; a high-speed photodetector, configured to convert the backscattered SERS signal lights into time-resolved electrical signals; a processor, for analyzing electrical signals, retrieving a SERS spectrum of the remote object to be measured, and controlling automatic scanning of a grating in the monochromator to achieve clock synchronization.

20 Claims, 2 Drawing Sheets

SYSTEM AND METHOD FOR REMOTE DETECTION OF SERS SPECTRA

TECHNICAL FIELD

The present disclosure relates to the field of SERS spectrum detection, in particular to a system for remote detection of SERS spectra and a method thereof.

BACKGROUND

Surface-enhanced Raman scattering (SERS) utilizes the Localized Surface Plasmon Resonances (LSPRs) of precious metal nanoparticles to greatly enhance the Raman signal, increasing sensitivity and allowing molecular "fingerprint" identification and simultaneous detection of multiple components. SERS has been widely used in the monitoring of environmental organic pollutants, food safety industry and national defense. In recent years, remote, real-time detection of SERS spectra has attracted widespread attention due to the important applicability prospects of Raman spectroscopy in hazardous condition detection, the Internet of Things and such.

Remote detection of SERS spectra uses a Raman spectrometer host at a fixed location (e.g., control room) to collect SERS spectra from a detection point at a large distance (e.g., several kilometers away). Currently, there are mainly two methods for remote detection of SERS spectra, which are described as follows.

(1) Remote detection using an optical fiber Raman coupling module: This method couples a Raman excitation light and a Raman signal light to the input and output optical fibers of the optical fiber Raman coupling module, respectively; by increasing the lengths of the input and output optical fibers, remote detection is achieved. In this method, the Raman spectrometer host is located in a control room; the coupling unit of the optical fiber Raman coupling module is located at the remote detection point; and the detection end of the optical fiber Raman coupling module is still spatially coupled into the light path. Therefore, each detection point requires one optical fiber Raman coupling module, which is not cost efficient. In addition, at each detection point a SERS substrate needs to be manually placed at the focal point of the spatially coupled light paths to ensure efficient excitation and coupling of SERS signals, which is time-consuming and labor-intensive, and makes it difficult to ensure the reliability of the detection data.

(2) Remote detection using an optical fiber Raman probe: Precious metal nanoparticles or structures are formed on the surface of an optical fiber to form an optical fiber SERS probe, and the optical fiber SERS probe is directly coupled to an optical fiber Raman coupling module; by increasing the length of the transmission section of the optical fiber SERS probe, remote detection is achieved. In this method, the Raman spectrometer host and the optical fiber Raman coupling module are both located in the control room; each remote detection point requires only one optical fiber, and by forming precious metal nanoparticles or structures on the surface of the optical fiber at the detection point, and utilizing the evanescent wave coupling effect of the optical fiber, remote detection of the SERS signal at the detection point is achieved, thereby largely reducing labor and material costs, and making the realization of real remote detection of SERS spectra closer than ever. However, in this method, the Raman excitation light is usually a continuous wave laser beam, which, while transmitted in the optical fiber, may excite the optical fiber's own Raman signal; and the optical fiber's Raman signal will accumulate along the entire optical fiber length, thereby greatly reducing the sensitivity of the detection of SERS spectra. Test results have shown that under continuous wave Raman excitation light, the length of the optical fiber SERS probe should not exceed 50 cm to ensure a good signal-to-noise ratio for the SERS spectrum. It can be seen that the optical fiber's own Raman effect under continuous wave excitation light severely limits the remote detection capability of the optical fiber SERS probe, which has become a major bottleneck restricting the development of remote detection of SERS spectra.

SUMMARY OF PARTICULAR EMBODIMENTS

An object of the present disclosure is to provide a system for remote detection of SERS spectra based on time-resolved spectrum analysis and a method thereof, which can limit the accumulated Raman effect of the optical fiber within the duration of a pulse, to greatly improve the remote detection capability of SERS spectra.

To achieve the above object, the present disclosure provides a technical solution below.

A system for remote detection of SERS spectra includes:

a pulsed laser light source, configured to emit pulsed laser light, the pulsed laser light being used as a Raman excitation light;

an optical fiber Raman coupling module connected to the pulsed laser light source, configured to couple the Raman excitation light to an optical fiber SERS probe;

the optical fiber Raman probe being connected to the optical fiber Raman coupling module, configured to transmit the Raman excitation light to an object to be measured to generate a SERS signal light, the SERS signal light including a forward-scattered SERS signal light and a backscattered SERS signal light; the backscattered SERS signal light being returned by the optical fiber SERS probe, and coupled to a monochromator through the optical fiber Raman coupling module;

the monochromator being connected to the optical fiber Raman coupling module, configured to split the backscattered SERS signal light, to obtain backscattered SERS signal lights at different wavelengths;

a high-speed photodetector connected to the monochromator, configured to convert the backscattered SERS signal lights at different detecting positions into time-resolved electrical signals;

a processor connected to the pulsed laser light source, the high-speed photodetector and the monochromator, respectively, for analyzing the time-resolved electrical signals, retrieving a SERS spectrum of the remote object to be measured, and controlling output of the pulsed laser light and automatic scanning of a grating in the monochromator to achieve clock synchronization.

Optionally, the optical fiber Raman coupling module includes an input fiber, an output fiber, a coupling module body, and a detection end; the input and output fibers are connected to one end of the coupling module body, the other end of the coupling module body is connected to the detection end; the input fiber is connected to the pulsed laser light source; the output fiber is connected to the monochromator; and the detection end is connected to the optical fiber SERS probe.

Optionally, the detection end includes an FC/PC or SMA905 standard optical fiber interface.

Optionally, the optical fiber SERS probe includes a transmission section and a detection section, where the transmission section is configured to transmit the Raman excitation light and the backscattered SERS signal light; and the detection section is configured to generate the SERS signal light.

Optionally, the transmission section is a quartz fiber; the detection section includes an optical fiber with precious metal nanoparticles formed on the surface.

Optionally, the monochromator includes an optical fiber adapter, configured to couple the backscattered SERS signal.

Optionally, the grating of the monochromator has a delay time of 100 ms-500 ms, the delay time of the grating being the interval between two adjacent rotations of the grating in the monochromator.

The present disclosure also provides a method for remote detection of SERS spectra, the method being applicable to the system for remote detection of SERS spectra above, the method including:

obtaining pulsed laser light, the pulsed laser light being a Raman excitation light.

detecting an object to be measured by using the Raman excitation light, to obtain a backscattered SERS signal light.

splitting the backscattered SERS signal light, to obtain backscattered SERS signal light at a single wavelength.

converting the backscattered SERS signal lights at a single wavelength, to obtain a time-resolved electrical signal.

analyzing the time-resolved electrical signal, to retrieve a SERS signal emitted from the remote detection position and limit the accumulated Raman effect of the optical fiber within the duration of a pulse.

subtracting a Raman signal of a transmission optical fiber itself of an optical fiber SERS probe within the duration of a pulse, to obtain a backscattered SERS signal of the object to be measured.

scanning different wavelengths, to obtain a SERS spectrum of the object to be measured.

Optionally, the splitting the backscattered SERS signal light to obtain backscattered SERS signal light at different wavelengths includes:

fixing a grating in a monochromator at a determined position, to obtain a backscattered SERS signal light at the current moment, the backscattered SERS signal light including a plurality of pulse signal lights;

performing averaging and background removal processing on the plurality of pulse signal lights, to obtain a backscattered SERS signal light at a wavelength;

changing the position of the grating, to obtain backscattered SERS signal lights at different wavelengths.

As compared with the prior art, the present disclosure provides the following technical effects: By using a pulsed laser instead of a continuous wave laser, based on time-resolved spectrum analyzing, the present disclosure limits the accumulated Raman effect of the optical fiber in remote detection within the duration of a pulse of the laser light, i.e., the optical fiber's own Raman background is related solely to the pulse width of the laser light, and unrelated to the actual length of the optical fiber, allowing greatly larger length of the transmission section of the optical fiber SERS probe and thereby improving the remote detection capability of SERS spectra. In addition, the present disclosure can obtain SERS spectrum information over the entire optical fiber length, allowing remote detection of SERS spectra at multiple detection points in the same optical fiber path, and having potential application prospects on hazardous condition detection, network detection of SERS spectra, etc.

BRIEF DESCRIPTION OF THE DRAWINGS

In order to more clearly explain the embodiments of the present disclosure or technical solutions in the prior art, accompanying drawings used in the embodiments will be briefly introduced below. As a matter of course, the drawings described below are only some embodiments of the present discourse; those skilled in the art would understand that other drawings can be obtained based on these drawings without inventive effort.

DETAILED DESCRIPTION OF PARTICULAR EMBODIMENTS

The technical solutions in the embodiments of the present disclosure will be clearly described below with reference to the accompanying drawings in the embodiments of the present disclosure. As a matter of course, the embodiments described below are only some embodiments of the present discourse. Any other embodiment made by those skilled in the art based on the embodiments herein without inventive effort shall fall within the scope of the present invention.

An object of the present disclosure is to provide a system for remote detection of SERS spectra and a method thereof, which can limit the accumulated Raman effect of the optical fiber within the duration of a pulse, to greatly improve the remote detection capability of SERS spectra.

For a better understanding of the above object, features, and advantages of the present disclosure, the present disclosure is further described in detail below with reference to the accompanying drawings and specific embodiments.

Figure 1:
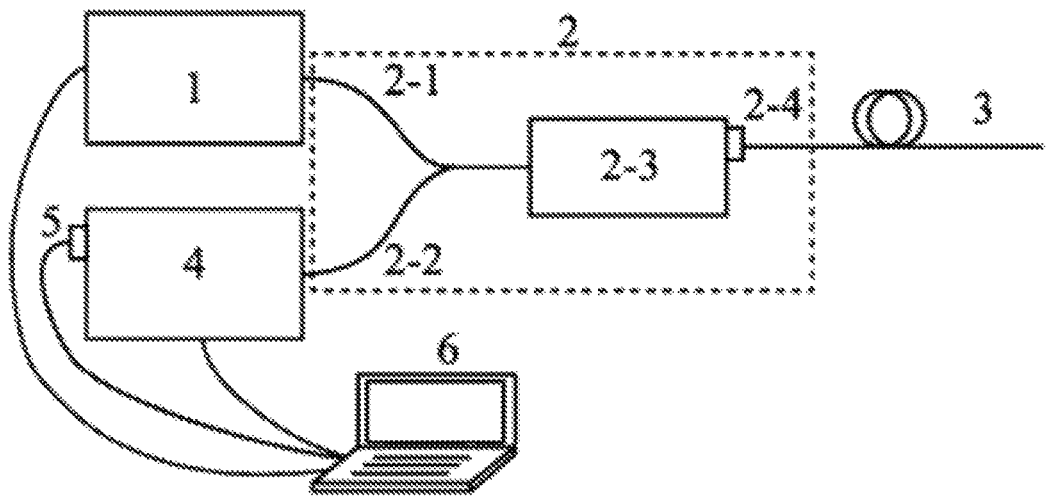
FIG. 1 is a structural block diagram of a system for remote detection of SERS spectra according to an embodiment of the present disclosure.

As shown in FIG. 1, a system for remote detection of SERS spectra: a pulsed laser light source 1, an optical fiber Raman coupling module 2, an optical fiber SERS probe 3, a monochromator 4, a high-speed photodetector 5, and a processor 6.

The pulsed laser light source 1 is configured to emit pulsed laser light, the pulsed laser light being used as a Raman excitation light. The pulsed laser light source 1 has a pulse width ranging from 0.1 ns to 1 ns, and a pulse repetition rate in the order of KHz.

The optical fiber Raman coupling module 2 is connected to the pulsed laser light source 1, and is configured to couple the Raman excitation light to the optical fiber SERS probe. The optical fiber Raman coupling module 2 includes an input fiber 2-1, an output fiber 2-2, a coupling module body 2-3, and a detection end 2-4. The pulsed laser light output by the pulsed laser light source 1 is coupled to the optical fiber Raman coupling module body 2-3 through the input fiber 2-1, and is coupled to the optical fiber SERS probe 3 through the detection end 2-4, to achieve SERS excitation. The detection end 2-4 includes an FC/PC or SMA905 standard optical fiber interface, to achieve efficient coupling between the optical fiber SERS probe and the optical fiber Raman probe.

The optical fiber SERS probe 3 is connected to the optical fiber Raman coupling module 2, for transmitting the Raman excitation light to an object to be measured to generate a SERS signal light, the SERS signal light including a forward-scattered SERS signal light and a backscattered SERS signal light. The backscattered SERS signal light is transmitted to the monochromator 4 through the optical fiber Raman coupling module. The optical fiber SERS probe 3 includes a transmission section and a detection section, where the transmission section is configured to transmit the Raman excitation light and the backscattered SERS signal light; and the detection section is configured to generate the SERS signal light. The transmission section may be an ordinary quartz fiber; the detection section may include an optical fiber with precious metal nanoparticles formed on the surface. The precious metal nanoparticles may generally be any one or two of the following: gold, and silver.

The SERS signal generated in the optical fiber SERS probe 3 is coupled and returns to the detection end 2-4 of the optical fiber Raman coupling module 2; and after being split and filtered by the optical fiber Raman coupling module body 2-3, it is received by the output fiber 2-2 and coupled to an entrance slit of the monochromator 4.

The monochromator 4 is connected to the optical fiber Raman coupling module 2, and is configured to split the backscattered SERS signal light, to obtain backscattered SERS signal lights at different wavelengths. An optical fiber adapter is provided at the entrance slit of the monochromator 4, and is configured for efficient coupling between the SERS signal in the output fiber and the monochromator 4.

The high-speed photodetector 5 is connected to the monochromator 4, and is configured to convert the backscattered SERS signal lights at different wavelengths into electrical signals. The SERS signal separated by the monochromator is emitted from and coupled to an exit slit of the monochromator, and is received by the high-speed photodetector for photoelectric conversion.

The processor 6 is connected to the pulsed laser light source 1, the high-speed photodetector 5 and the monochromator 4, respectively, for processing electrical signals, obtaining a SERS spectrum of the object to be measured, and controlling output of the pulsed laser light and automatic scanning of a grating in the monochromator 4 to achieve clock synchronization. The processor 6 is provided with a high-speed data acquisition card, for amplification and high-speed acquisition of electric signals.

According to the specific embodiment provided by the present disclosure, the present disclosure provides the following technical effects: By using a pulsed laser instead of a continuous wave laser, based on time-resolved spectrum analyzing, the present disclosure limits the accumulated Raman effect of the optical fiber in remote detection within the duration of a pulse of the laser light, i.e., the optical fiber's own Raman background is related solely to the pulse width of the laser light, and unrelated to the actual length of the optical fiber, allowing greatly larger length of the transmission section of the optical fiber SERS probe and thereby improving the remote detection capability of SERS spectra. In addition, the present disclosure can obtain SERS spectrum information over the entire optical fiber length, allowing remote detection of SERS spectra at multiple detection points in the same optical fiber path, and having potential application prospects on hazardous condition detection, network detection of SERS spectra, etc.

Figure 2:
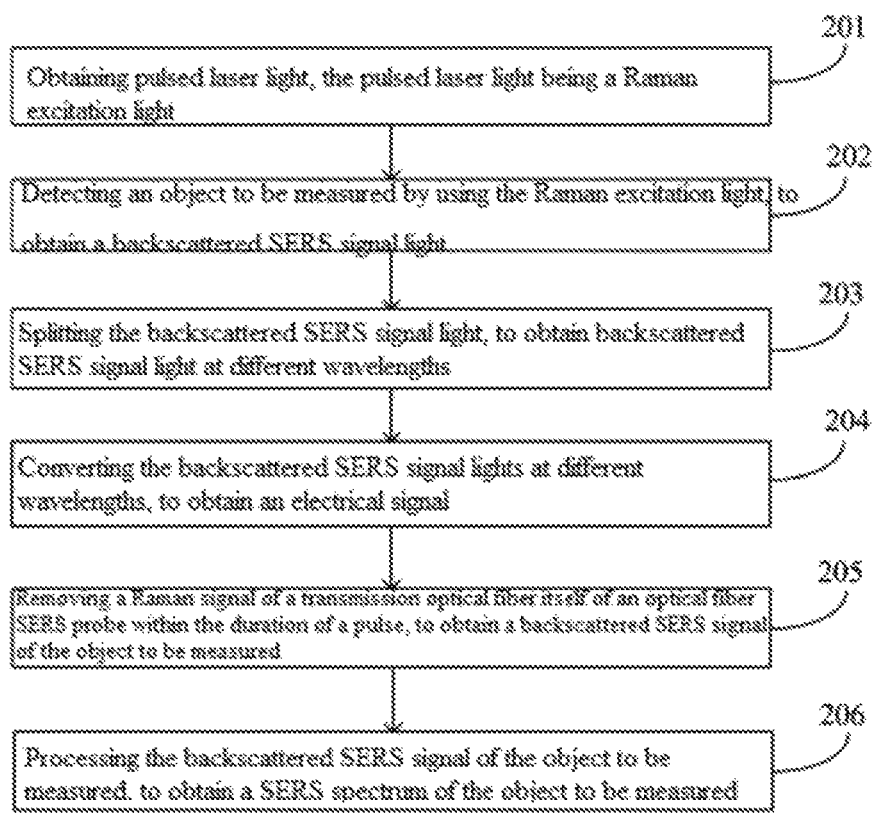
FIG. 2 is a flowchart of a method for remote detection of SERS spectra according to an embodiment of the present disclosure.

As shown in FIG. 2, a method for remote detection of SERS spectra includes:

Step 101: obtaining pulsed laser light, the pulsed laser light being a Raman excitation light.

Step 102: detecting an object to be measured by using the Raman excitation light, to obtain a backscattered SERS signal light.

Step 103: splitting the backscattered SERS signal light, to obtain backscattered SERS signal light at different wavelengths. Specifically, Fixing a grating in a monochromator at a determined position, to obtain a backscattered SERS signal light at the current moment, the backscattered SERS signal light including a plurality of pulse signal lights;

performing averaging and background removal processing on the plurality of pulse signal lights, to obtain a backscattered SERS signal light at a wavelength;

changing the position of the grating, to obtain backscattered SERS signal lights at different wavelengths.

Step 104: Converting the backscattered SERS signal lights at different wavelengths, to obtain an electrical signal.

Step 105: Removing a Raman signal of a transmission optical fiber itself of an optical fiber SERS probe within the duration of a pulse, to obtain a backscattered SERS signal of the object to be measured.

Step 106: Processing the backscattered SERS signal of the object to be measured, to obtain a SERS spectrum of the object to be measured.

Detailed steps include:

1) Initial configuration: Selecting appropriate laser power, pulse width, pulse repetition rate, and a grating delay time for the monochromator; and determining a wavelength scanning range for the monochromator according to a Raman spectral range of a molecule to be measured.

2) Intensity detection: Turning on the pulsed laser light source, fixing the grating in the monochromator at a determined position, and using the high-speed photodetector and the computer to record the intensity of a backscattered Raman signal of the optical fiber SERS probe in real time, to obtain dynamic information of the Raman signal over time.

3) Extraction of SERS signal from the object to be measured: In the above dynamic Raman intensity over time, while the pulsed light is transmitted in the transmission section of the optical fiber SERS probe, the detection signal includes only the Raman signal of the optical fiber itself; and while the pulsed light is transmitted in the detection section of the optical fiber SERS probe, the detection signal includes both the optical fiber's own Raman signal and the SERS signal of the object to be measured. Individual Raman signal values of a plurality of pulse periods are added and averaged, and the Raman background of the optical fiber itself is removed, to obtain distribution information of the Raman intensity at the grating position (corresponding to a wave number) along the optical fiber SERS probe length.

4) Spectral scanning: rotating automatically the grating of the monochromator by one step, in every grating delay time; and then repeating steps 2) and 3); and in real time recording distribution of the Raman intensity along the optical fiber SERS probe length at different wave numbers; combining all the measured data, to obtain three-dimensional distribution information of Raman intensity that varies along with the wave number and the length of the optical fiber SERS probe; and then obtaining SERS spectrum information at any detection point of the optical fiber SERS probe.

Figure 3:
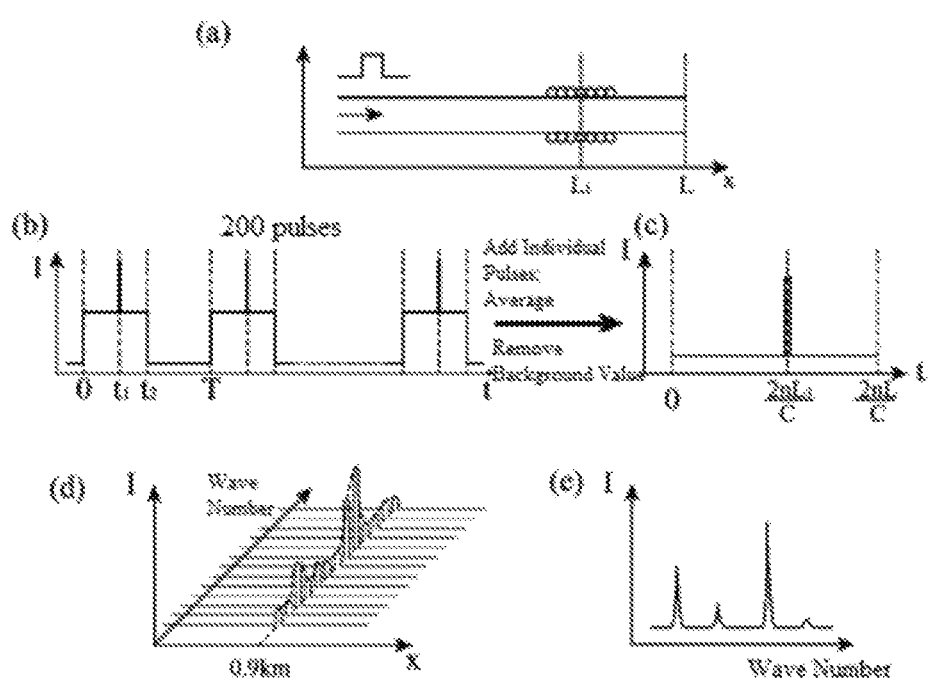
FIG. 3 is an operating principle diagram of a system for remote detection of SERS spectra according to an embodiment of the present disclosure.

FIG. 3 is an operating principle diagram of a system for remote detection of SERS spectra. As shown in FIG. 3, the initial configuration of the system is as follows: the center wavelength of the pulsed laser light source is 532 nm, the pulse width is 1 ns, and the repetition rate is 2 KHz; the transmission section of the optical fiber SERS probe has a length of 1.2 km, and at 0.9 km of the length the optical fiber SERS probe has a SERS detection section having a length of 1 cm (shown as (a) in FIG. 3); the wavelength scanning range of the monochromator is determined to be 550 nm-700 nm, the grating is moved to its initial position (corresponding to a wavelength of 550 nm), and the grating delay time is configured to 100 ms.

According to the above parameters, 200 laser pulses are emitted from the light source within a grating delay time and complete their transmission in the optical fiber SERS probe. At t=0, a first laser pulse enters the optical fiber SERS probe, and as the laser pulse is transmitted forward in the optical fiber SERS probe, a real-time backscattered Raman signal as shown in FIG. 3(b) is obtained. At the beginning (t<t1), the detected backscattered Raman signal includes only the Raman signal of the optical fiber itself. When the pulsed light is transmitted to the detection section of the optical fiber SERS probe (t1=2nL1/c=9 μs, n being the refractive index of the optical fiber; n=1.5, and c is the speed of light), the detection signal includes both the optical fiber's own Raman signal and the SERS signal of the object to be measured. When t=2nL/c=12 μs, the pulsed laser is transmitted to the end of the optical fiber SERS probe, completing one laser pulse period of Raman signal detection. Because there are 200 laser pulses within one grating delay time, 200 detection pulse signals will be obtained at each wavelength (as shown in FIG. 3(b)). By adding and averaging the 200 Raman pulse signals in FIG. 3(b), and removing the Raman signal of the optical fiber as a background, an average SERS intensity over time is obtained and shown in FIG. 3(c). According to optical time-domain analysis, the horizontal axis, time, corresponds to a spatial position of the optical fiber SERS probe, i.e., x=ct/2n.

It should be noted that, by averaging a plurality of Raman pulses detected within one grating delay time, SERS intensity distribution information at a single wavelength is obtained. In order to achieve the detection of an entire SERS spectrum, the grating is to be rotated by one step every delay time, and the detection process above is repeated to obtain SERS intensity distribution information of the object to be measured at different wavelengths. The SERS intensity distributions at all wavelengths are combined, to obtain a three-dimensional SERS distribution result as shown in FIG. 3(d). Therefore, we can easily obtain the SERS spectrum signals at different detection sections in the optical fiber SERS probe. For example, in FIG. 3(d), when x=0.9 km, the SERS spectrum at the detection section 0.9 km of the optical fiber SERS probe is obtained (as shown in FIG. 3(e)).

The embodiments in this specification are described in a progressive manner. Each embodiment focuses on the differences from other embodiments. For the same and similar parts, please refer to the other embodiments. Method embodiments correspond to system embodiments, and therefore for the relevant parts of the method embodiments, please refer to the corresponding system embodiments.

Specific examples are used herein to explain the principles and implementation of the present invention. The description of the above embodiments is for illustrative purposes only, for a better understanding of the method of the present disclosure and its core ideas. Those skilled in the art can make modifications to the specific implementations and the applications of the present disclosure. In summary, the content of this specification should not be construed as a limitation on the present invention.

What is claimed is:

1. A system for remote detection of SERS spectra, comprising:
    a pulsed laser light source, configured to emit pulsed laser light, the pulsed laser light being used as a Raman excitation light;
    an optical fiber Raman coupling module connected to the pulsed laser light source, configured to couple the Raman excitation light to an optical fiber SERS probe;
    the optical fiber SERS probe being connected to the optical fiber Raman coupling module, configured to transmit the Raman excitation light to an object to be measured to generate a SERS signal light, the SERS signal light comprising a forward-scattered SERS signal light and a backscattered SERS signal light; the backscattered SERS signal light being returned by the optical fiber SERS probe, and coupled to a monochromator through the optical fiber Raman coupling module; the optical fiber SERS probe having an increased length to achieve remote detection of SERS spectra;
    the monochromator being connected to the optical fiber Raman coupling module, configured to split the backscattered SERS signal light, to obtain backscattered SERS signal lights at different wavelengths; an optical fiber adapter being provided at an entrance slit of the monochromator, and configured for efficient coupling between the SERS signal in an output fiber and the monochromator;
    a high-speed photodetector connected to the monochromator, configured to convert the backscattered SERS signal lights into time-resolved electrical signals; and
    a processor connected to the pulsed laser light source, the high-speed photodetector and the monochromator, respectively, for performing time-domain analysis on the time-resolved electrical signals, removing a Raman background of the optical fiber itself by adding and averaging a plurality of Raman pulse signals, retrieving a SERS spectrum of the object to be measured at a remote detection point, and controlling output of the pulsed laser light and automatic scanning of a grating in the monochromator to achieve clock synchronization.

2. The system for remote detection of SERS spectra according to claim 1, wherein the optical fiber Raman coupling module comprises an input fiber, an output fiber, a coupling module body and a detection end; the input and output fibers are connected to one end of the coupling module body, the other end of the coupling module body is connected to the detection end; the input fiber is connected to the pulsed laser light source; the output fiber is connected to the monochromator; and the detection end is connected to the optical fiber SERS probe.

3. The system for remote detection of SERS spectra according to claim 2, wherein the detection end includes an FC/PC or SMA905 standard optical fiber interface.

4. A method for remote detection of SERS spectra, the method being applicable to the system for remote detection of SERS spectra according claim 3, the method comprising:
    obtaining pulsed laser light, the pulsed laser light being a Raman excitation light;
    detecting an object to be measured by using the Raman excitation light, to obtain a backscattered SERS signal light;
    splitting the backscattered SERS signal light, to obtain backscattered SERS signal lights at different wavelengths;
    converting the backscattered SERS signal lights at different wavelengths, to obtain time-resolved electrical signals, and performing time-domain analysis on the time-resolved electrical signals;
    subtracting a Raman signal of a transmission optical fiber itself of an optical fiber SERS probe within the duration of a pulse by adding and averaging a plurality of Raman pulse signals, to obtain a backscattered SERS signal of the object to be measured; and processing the backscattered SERS signal of the object to be measured, to obtain a SERS spectrum of the object to be measured at a remote detection point.

5. The method for remote detection of SERS spectra according to claim 4, wherein the splitting the backscattered SERS signal light to obtain backscattered SERS signal light at different wavelengths comprises:

fixing a grating in a monochromator at a determined position, to obtain a backscattered SERS signal light at the current moment, the backscattered SERS signal light including a plurality of pulse signal lights;

performing averaging and background removal processing on the plurality of pulse signal lights, to obtain a backscattered SERS signal light at a wavelength; and changing the position of the grating, to obtain backscattered SERS signal lights at different wavelengths.

6. A method for remote detection of SERS spectra, the method being applicable to the system for remote detection of SERS spectra according claim 2, the method comprising:

obtaining pulsed laser light, the pulsed laser light being a Raman excitation light;

detecting an object to be measured by using the Raman excitation light, to obtain a backscattered SERS signal light;

splitting the backscattered SERS signal light, to obtain backscattered SERS signal lights at different wavelengths;

converting the backscattered SERS signal lights at different wavelengths, to obtain time-resolved electrical signal signals, and performing time-domain analysis on the time-resolved electrical signals;

subtracting a Raman signal of a transmission optical fiber itself of an optical fiber SERS probe within the duration of a pulse by adding and averaging a plurality of Raman pulse signals, to obtain a backscattered SERS signal of the object to be measured; and processing the backscattered SERS signal of the object to be measured, to obtain a SERS spectrum of the object to be measured at a remote detection point.

7. The method for remote detection of SERS spectra according to claim 6, wherein the splitting the backscattered SERS signal light to obtain backscattered SERS signal light at different wavelengths comprises:

fixing a grating in a monochromator at a determined position, to obtain a backscattered SERS signal light at the current moment, the backscattered SERS signal light including a plurality of pulse signal lights;

performing averaging and background removal processing on the plurality of pulse signal lights, to obtain a backscattered SERS signal light at a wavelength; and changing the position of the grating, to obtain backscattered SERS signal lights at different wavelengths.

8. The system for remote detection of SERS spectra according to claim 1, wherein the optical fiber SERS probe comprises a transmission section and a detection section, where the transmission section is configured to transmit the Raman excitation light and the backscattered SERS signal light; and the detection section is configured to generate the SERS signal light.

9. The system for remote detection of SERS spectra according to claim 8, wherein the transmission section is a quartz fiber; the detection section comprises an optical fiber with precious metal nanoparticles formed on the surface.

10. A method for remote detection of SERS spectra, the method being applicable to the system for remote detection of SERS spectra according claim 9, the method comprising:

obtaining pulsed laser light, the pulsed laser light being a Raman excitation light;

detecting an object to be measured by using the Raman excitation light, to obtain a backscattered SERS signal light;

splitting the backscattered SERS signal light, to obtain backscattered SERS signal lights at different wavelengths;

converting the backscattered SERS signal lights at different wavelengths, to obtain time-resolved electrical signal signals, and performing time-domain analysis on the time-resolved electrical signals;

subtracting a Raman signal of a transmission optical fiber itself of an optical fiber SERS probe within the duration of a pulse by adding and averaging a plurality of Raman pulse signals, to obtain a backscattered SERS signal of the object to be measured; and processing the backscattered SERS signal of the object to be measured, to obtain a SERS spectrum of the object to be measured at a remote detection point.

11. The method for remote detection of SERS spectra according to claim 10, wherein the splitting the backscattered SERS signal light to obtain backscattered SERS signal light at different wavelengths comprises:

fixing a grating in a monochromator at a determined position, to obtain a backscattered SERS signal light at the current moment, the backscattered SERS signal light including a plurality of pulse signal lights;

performing averaging and background removal processing on the plurality of pulse signal lights, to obtain a backscattered SERS signal light at a wavelength; and changing the position of the grating, to obtain backscattered SERS signal lights at different wavelengths.

12. A method for remote detection of SERS spectra, the method being applicable to the system for remote detection of SERS spectra according claim 8, the method comprising:

obtaining pulsed laser light, the pulsed laser light being a Raman excitation light;

detecting an object to be measured by using the Raman excitation light, to obtain a backscattered SERS signal light;

splitting the backscattered SERS signal light, to obtain backscattered SERS signal lights at different wavelengths;

converting the backscattered SERS signal lights at different wavelengths, to obtain time-resolved electrical signal signals, and performing time-domain analysis on the time-resolved electrical signals;

subtracting a Raman signal of a transmission optical fiber itself of an optical fiber SERS probe within the duration of a pulse by adding and averaging a plurality of Raman pulse signals, to obtain a backscattered SERS signal of the object to be measured; and processing the backscattered SERS signal of the object to be measured, to obtain a SERS spectrum of the object to be measured at a remote detection point.

13. The method for remote detection of SERS spectra according to claim 12, wherein the splitting the backscattered SERS signal light to obtain backscattered SERS signal light at different wavelengths comprises:

fixing a grating in a monochromator at a determined position, to obtain a backscattered SERS signal light at the current moment, the backscattered SERS signal light including a plurality of pulse signal lights;

performing averaging and background removal processing on the plurality of pulse signal lights, to obtain a backscattered SERS signal light at a wavelength; and changing the position of the grating, to obtain backscattered SERS signal lights at different wavelengths.

14. The system for remote detection of SERS spectra according to claim 1, wherein the monochromator comprises an optical fiber adapter, configured to couple the backscattered SERS signal.

15. A method for remote detection of SERS spectra, the method being applicable to the system for remote detection of SERS spectra according claim 14, the method comprising:

obtaining pulsed laser light, the pulsed laser light being a Raman excitation light;

detecting an object to be measured by using the Raman excitation light, to obtain a backscattered SERS signal light;

splitting the backscattered SERS signal light, to obtain backscattered SERS signal lights at different wavelengths;

converting the backscattered SERS signal lights at different wavelengths, to obtain time-resolved electrical signals, and performing time-domain analysis on the time-resolved electrical signals;

subtracting a Raman signal of a transmission optical fiber itself of an optical fiber SERS probe within the duration of a pulse by adding and averaging a plurality of Raman pulse signals, to obtain a backscattered SERS signal of the object to be measured; and processing the backscattered SERS signal of the object to be measured, to obtain a SERS spectrum of the object to be measured at a remote detection point.

16. The method for remote detection of SERS spectra according to claim 15, wherein the splitting the backscattered SERS signal light to obtain backscattered SERS signal light at different wavelengths comprises:

fixing a grating in a monochromator at a determined position, to obtain a backscattered SERS signal light at the current moment, the backscattered SERS signal light including a plurality of pulse signal lights;

performing averaging and background removal processing on the plurality of pulse signal lights, to obtain a backscattered SERS signal light at a wavelength; and changing the position of the grating, to obtain backscattered SERS signal lights at different wavelengths.

17. The system for remote detection of SERS spectra according to claim 1, wherein the grating of the monochromator has a delay time of 100 ms-500 ms, the delay time of the grating being the interval between two adjacent rotations of the grating in the monochromator.

18. A method for remote detection of SERS spectra, the method being applicable to the system for remote detection of SERS spectra according to claim 17, the method comprising:

obtaining pulsed laser light, the pulsed laser light being a Raman excitation light;

detecting an object to be measured by using the Raman excitation light, to obtain a backscattered SERS signal light;

splitting the backscattered SERS signal light, to obtain backscattered SERS signal lights at different wavelengths;

converting the backscattered SERS signal lights at different wavelengths, to obtain time-resolved electrical signals, and performing time-domain analysis on the time-resolved electrical signals;

subtracting a Raman signal of a transmission optical fiber itself of an optical fiber SERS probe within the duration of a pulse by adding and averaging a plurality of Raman pulse signals, to obtain a backscattered SERS signal of the object to be measured; and processing the backscattered SERS signal of the object to be measured, to obtain a SERS spectrum of the object to be measured at a remote detection point.

19. A method for remote detection of SERS spectra, the method being applicable to the system for remote detection of SERS spectra according claim 1, the method comprising:

obtaining pulsed laser light, the pulsed laser light being a Raman excitation light;

detecting an object to be measured by using the Raman excitation light, to obtain a backscattered SERS signal light;

splitting the backscattered SERS signal light, to obtain backscattered SERS signal lights at different wavelengths;

converting the backscattered SERS signal lights at different wavelengths, to obtain time-resolved electrical signals, and performing time-domain analysis on the time-resolved electrical signals;

subtracting a Raman signal of a transmission optical fiber itself of an optical fiber SERS probe within the duration of a pulse by adding and averaging a plurality of Raman pulse signals, to obtain a backscattered SERS signal of the object to be measured; and processing the backscattered SERS signal of the object to be measured, to obtain a SERS spectrum of the object to be measured at a remote detection point.

20. The method for remote detection of SERS spectra according to claim 19, wherein the splitting the backscattered SERS signal light to obtain backscattered SERS signal light at different wavelengths comprises:

fixing a grating in a monochromator at a determined position, to obtain a backscattered SERS signal light at the current moment, the backscattered SERS signal light including a plurality of pulse signal lights;

performing averaging and background removal processing on the plurality of pulse signal lights, to obtain a backscattered SERS signal light at a wavelength; and changing the position of the grating, to obtain backscattered SERS signal lights at different wavelengths.

* * * * *